United States Patent Office 3,352,507
Patented Nov. 14, 1967

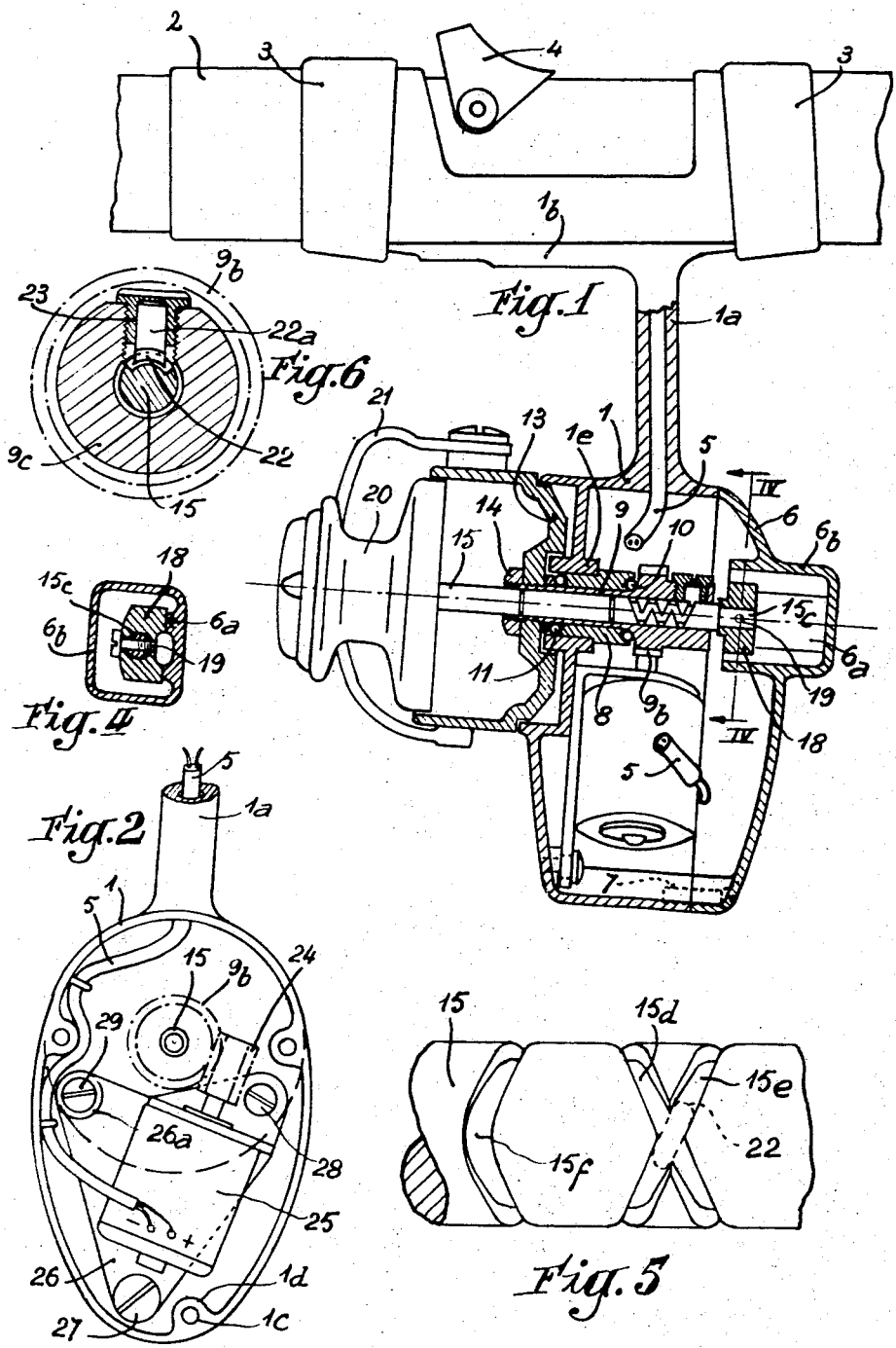

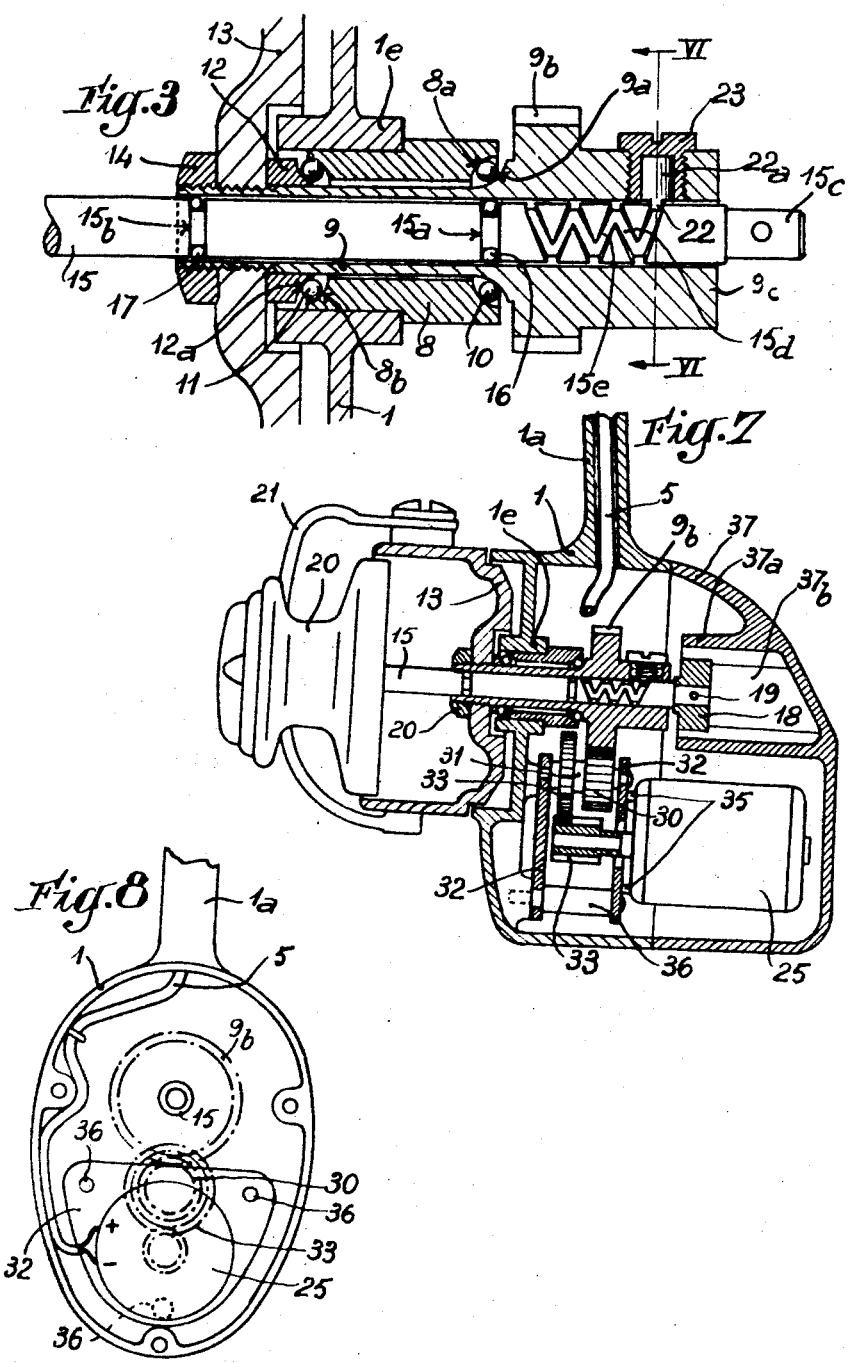

3,352,507
MOTOR DRIVEN FISHING REELS
Louis Henri Armand Boussageon, Boite Postale No. 3, Chabeuil, France
Filed Jan. 21, 1965, Ser. No. 426,858
Claims priority, application France, Feb. 3, 1964, 661, Patent 1,426,103; Mar. 9, 1964, 663, Patent 87,357
2 Claims. (Cl. 242—84.21)

ABSTRACT OF THE DISCLOSURE

A fishing reel carried by a rod and having a non-rotatable drum, a flyer rotatable around the drum and carried by a rotatable spindle, a shaft attached to the drum and slidably mounted in the spindle. An electric motor to rotate the spindle and a casing having an elongated transverse cross-section having a major axis disposed radially with respect to the rod.

The invention relates to fishing reels in which the line is wound by means of a rotating pick-up or flyer on a non-rotatable drum or spool which moves axially to and fro with respect to the pick-up.

An object of this invention is to provide a fishing reel with non-rotatable drum wherein the pick-up is rotated by an electric motor disposed within the reel casing.

A further object of this invention is to provide a fishing reel wherein the axial to and fro movement of the non-rotatable line drum may be realized by simple and reliable means.

Still another object of the present invention is to provide a fishing reel wherein the pick-up is carried by a tubular spindle which is rotated by an electric motor through an appropriate transmission, while the drum is carried by a non-rotatable inner shaft slidably carried by the tubular spindle, the said inner shaft being formed with a groove having the shape of two helices of inverted hand, the said groove co-acting with a follower finger carried by the tubular spindle, in such manner that rotation of the latter may cause to and fro axial movement of the shaft and of the drum carried thereby.

Still another object of the present invention is to provide a fishing reel wherein, when the line loses tension, it cannot be caught and blocked between the flyer-carrying member and the gear casing.

In the annexed drawings:

FIG. 1 is a longitudinal section of a fishing reel according to this invention.

FIG. 2 is a rear view of the reel with the cover removed.

FIG. 3 is an enlarged fragmental longitudinal section showing the mechanism of the pick-up spindle and of the groove and follower gearing by means of which the drum carrying shaft is reciprocated.

FIG. 4 is a fragmental transverse section taken through line IV—IV of FIG. 1, but only showing the parts which are situated in the plane of section.

FIG. 5 is a fragmental large scale side view showing one of the ends of the grooved portion of the non-rotatable drum carrying shaft.

FIG. 6 is a transverse section taken through line VI—VI of FIG. 3.

FIGS. 7 and 8 are views similar to FIGS. 1 and 2 but showing a modified embodiment.

Referring to FIG. 1, the casing or hollow body 1 of the reel has an upwardly extending tubular arm or foot 1a which terminates in a horizontally elongated base 1b adapted to be retained against the side of the fishing rod handle 2 by means of slidable rings 3. The fishing rod itself is preferably of the kind described in my co-pending U.S. patent application for "Improvements in Fishing Rods." In such a rod an electric cell, not illustrated, is disposed within the handle to supply electric power to the reel driving motor. Handle 2 also houses a two-way switch, not shown, which may be actuated by an external stirrup-like member 4 to energize the reel-driving motor under two different voltages, the electric cell being provided for this purpose with an intermediate terminal. The electrical connections between handle 2 and the reel are effected by means of inner plug-and-socket contact devices, not illustrated, respectively carried by the said handle 2 and the base 1b and those of these contact devices which are fixed to base 1b are connected with the reel driving motor by means of a twin cable 5 which passes through the tubular supporting arm 1a.

The rear side of casing 1 is closed by a cover 6 which is secured by means of screws such as 7 engaged into screw-threaded perforations 1c (FIG. 2) provided in inner bosses 1d of the lateral wall of the casing. The front wall of the said casing is formed with a tubular boss 1e (FIGS. 1 and 3) in which is secured a sleeve or bearing 8. In the example illustrated sleeve 8 is a force fit in boss 1e. Sleeve 8 rotatably supports a tubular spindle 9 by means of balls 10 and 11. As more clearly shown in FIG. 3, balls 10 are retained between an outer conical race 8a formed at the inner end of sleeve 8, and an inner conical race 9a provided on the side of a pinion 9b integral with spindle 9, while balls 11 run between an outer conical race 8b formed at the outer end of sleeve 8, and an inner conical race 12a formed on an annular member 12 which is slidably mounted on spindle 9, in the vicinity of the outer end thereof. This outer end is screw-threaded, as shown, and it carries a cup 13 which acts as a nut to retain member 12 in the axial direction on spindle 9, the said cup being locked in position by a counter-nut 14.

The tubular spindle 9 in turn supports an inner shaft 15 by means of balls 16 and 17 which are disposed within grooves 15a and 15b of the said shaft. These balls roll directly on the smooth inner wall of spindle 9 and it will be appreciated that with such an arrangement shaft 15 is rotatably and slidably mounted within spindle 9. The inner end 15c of shaft 15 is of reduced diameter and it carries a pad 18 which has been supposedly removed in FIGS. 2 and 3, but is clearly to be seen in FIGS. 1 and 4. This pad 18 is secured in angular and longitudinal position by means of a transverse screw 19 and it is adapted to slide on a lateral guiding surface 6a provided within a small inwardly opening housing 6b in one with cover 6. Owing to this arrangement shaft 15 is prevented from rotating about its own axis without however hindering free rotation of spindle 9 within which it is axially slidable.

The outer end of the non-rotatable shaft 15 supports the conventional drum or spool 20 (FIG. 1) adapted to receive the fishing line. Spool 20 is partly engaged with an appropriate lateral clearance into the above described cup 13 carried by the tubular spindle 9. Cup 13 carries the conventional pick-up or flyer 21 which is swingable thereon about a transverse axis. Since this well-known arrangement forms no part of the present invention, it has not been elaborately detailed in the drawings.

The non-rotatable inner shaft 15 has formed on its periphery in the vicinity of its inner end 15c a double helical groove comprising two mutually intersecting elementary helical grooves 15d and 15e (FIGS. 3 and 5), of equal but opposed pitch, the respective ends of which are smoothly connected with each other by arcuate connecting grooves such as 15f. This double helical groove cooperates with a groove follower or finger 22 (FIGS. 3, 5 and 6) of elongated cross-section, as indicated in dash-lines in FIG. 5 (the term "cross-section" referring of course to the section of follower 22 by a plane transverse to the axis of the follower itself, which axis is radial with respect to shaft 15, i.e. vertical in FIG. 6). Groove follower 22 has a cylindrical tail 22a which is rotatably mounted in a hollow screw or plug 23 radially screwed in the inner end 9c of spindle 9 (FIGS. 3 and 6). When spindle 9 rotates, follower 22 slides along an elementary groove such as 15d, then along an end connecting groove 15f, then along the other elementary groove 15e, wherefrom it is returned to the first elementary groove 15d by the second end connecting groove 15f, without any possibility of direct passage from one elementary helical groove to the other at the points of intersection, owing to its elongated shape. Shaft 15 and spool 20 are thus continuously reciprocated axially when spindle 9 rotates together with cup 13 and flyer 21.

Pinion 9b has helical teeth and it meshes with a worm 24 (FIG. 2) carried by the shaft of an electric motor 25 (FIGS. 1 and 2). The latter is supported by a base plate 26 which is secured to casing 1 by means of three screws 27, 28 and 29. Screw 27 is disposed close to the opposed end of motor 25 with respect to worm 24 and the corresponding hole of plate 26 has substantially the same diameter as the screw itself. Screw 28 is in the vicinity of worm 24 and the corresponding hole of plate 26 is of substantially larger diameter so as to permit a noticeable angular adjustment of plate 26 about the axis of screw 27. As to screw 28, its head is eccentrically disposed with respect to its rod or body and this head is rotatably disposed in a tubular boss 26a of plate 26. It will be appreciated that when screws 27 and 28 are not fully screwed down, rotation of screw 29 will cause plate 26 to oscillate about screw 27 acting as a pivot. This permits of adjusting the position of worm 24 with respect to pinion 9b.

It will be observed that the cylindrical periphery of cup-shaped member 13 has at its rear end a portion of somewhat reduced diameter which fits with an appropriate clearance in a cylindrical depression provided in the front side of casing 1. Furthermore, the transverse cross-section of the latter is of elongated shape with a rounded upper end, which is co-axial to spindle 9 and to member 13, the radius of the said end being equal to the outer radius of member 13. It is obvious that under such conditions even if the line is caught in the slit-like space between the periphery of member 13 and casing 1, it cannot become frictionally blocked on stationary surfaces and is easily disengaged by the flyer.

In the modified embodiment of FIGS. 7 and 8, pinion 9b which is here in the form of a spur gear, meshes with a smaller pinion 30 carried by a tubular shaft 31 rotatably supported between two cheeks 32. Shaft 31 also carries a gear 33 which meshes with a pinion 34 mounted on the shaft of motor 25. The latter is itself supported by the adjacent cheek 32, as by means of stays such as 35. Cheeks 32 are secured to the transverse wall of casing 1 by means of screws and stays such as 36. Owing to the position of motor 25, the cover, here referenced 37, is slightly different from the cover 6 of the embodiment of FIG. 1, but it also comprises a housing 37a provided with a guiding surface 37b for pad 18.

In both embodiments the elongated reel casing or body 1 is so disposed with respect to its supporting arm 1a that its major axis is substantially radial with respect to the rod handle 2. For instance in FIG. 1 the elongated axis of casing 1 is vertical while the axis of handle 2 is horizontal, both axes being substantially in the plane of the drawing. This arrangement affords the advantage that if the fishing line becomes loose, it is less liable to be retained by the casing in the space situated between same and the rod handle, and to become entangled in the said space.

I claim:
1. A fishing reel comprising a casing of elongated transverse cross-section having a major axis and a minor axis, a reel attachment foot secured to said casing and extending substantially in the direction of said major axis for attachment of the reel to a fishing rod, a front section of said casing being in circular configuration of a determined radius, a forwardly open cup-shaped winding member rotatably carried by said casing substantially concentric with said front section and having a diameter substantially equal to that of said front section, a rear edge portion of said winding member and a forward edge of said front section forming a very narrow slit, a normally non-rotatable spool coaxial with and at least partly disposed within said winding member, a pick-up element on said winding member adapted to engage and wind said line onto said spool when the winding member is rotated, means within said casing for rotating said cup-shaped member comprising a gear connected to the winding member, and an electric motor having an output worm directly engaging said gear and means supporting said motor to extend substantially in the direction of the major axis of said casing.

2. In a fishing reel as claimed in claim 1, said foot comprising a hollow arm having at its end remote from said casing an elongated base, and said motor receiving electric energy through conductors passing through said hollow arm.

References Cited

UNITED STATES PATENTS

| | | | |
|---|---|---|---|
| 2,760,736 | 8/1956 | Mihalko et al. | 242—84.1 |
| 2,773,655 | 12/1956 | Mandolf | 242—84.21 |
| 2,774,545 | 12/1956 | Chambers | 242—84.21 |
| 3,116,892 | 1/1964 | Pickard | 242—84.1 |
| 3,195,830 | 7/1965 | Balaguer | 242—84.21 |
| 3,226,873 | 1/1966 | Wood | 242—84.2 |
| 3,248,819 | 5/1966 | Stealy | 242—84.1 X |

FOREIGN PATENTS

| | | |
|---|---|---|
| 242,286 | 12/1962 | Australia. |
| 1,299,923 | 6/1962 | France. |
| 919,566 | 10/1954 | Germany. |

FRANK J. COHEN, *Primary Examiner.*

B. S. TAYLOR, *Assistant Examiner.*